(12) United States Patent
Hirokawa

(10) Patent No.: US 9,299,086 B2
(45) Date of Patent: Mar. 29, 2016

(54) INFORMATION PROCESSING APPARATUS, INFORMATION PROCESSING METHOD, AND COMPUTER-READABLE RECORDING MEDIUM WHICH CONTROLS THE DISPLAYING OF CONTENT FROM A SERVER

(71) Applicant: Tatsuma Hirokawa, Kanagawa (JP)

(72) Inventor: Tatsuma Hirokawa, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/565,533

(22) Filed: Dec. 10, 2014

(65) Prior Publication Data

US 2015/0186935 A1 Jul. 2, 2015

(30) Foreign Application Priority Data

Dec. 26, 2013 (JP) .................................. 2013-270270

(51) Int. Cl.
*G06Q 30/02* (2012.01)
*H04N 1/00* (2006.01)

(52) U.S. Cl.
CPC ....... *G06Q 30/0251* (2013.01); *H04N 1/00244* (2013.01); *H04N 1/00392* (2013.01); *H04N 1/00411* (2013.01); *H04N 1/00413* (2013.01); *H04N 1/00477* (2013.01); *H04N 2201/0094* (2013.01)

(58) Field of Classification Search
CPC .................................................... G06Q 30/0251
USPC ..................................... 358/1.13, 1.14, 1.15
See application file for complete search history.

(56) References Cited

U.S. PATENT DOCUMENTS

| 2009/0015569 A1* | 1/2009 | Machida et al. ............... 345/204 |
| 2009/0015857 A1* | 1/2009 | Tsurumi ....................... 358/1.14 |
| 2013/0054356 A1* | 2/2013 | Richman ............... G06Q 30/00 705/14.49 |

FOREIGN PATENT DOCUMENTS

| JP | 2009-116653 | 5/2009 |
| JP | 2013-125147 | 6/2013 |

* cited by examiner

*Primary Examiner* — Jacky X Zheng
(74) *Attorney, Agent, or Firm* — Oblon, McClelland, Maier & Neustadt, L.L.P.

(57) ABSTRACT

An information processing apparatus according to the present invention includes an acquisition unit, a first control unit, and a second control unit. The acquisition unit acquires a plurality of contents from a server. The first control unit provides control to display the contents on a display unit during execution of predetermined processing. The second control unit provides control to switch the contents being displayed in response to a user operation.

10 Claims, 9 Drawing Sheets

INFORMATION PROCESSING APPARATUS, INFORMATION PROCESSING METHOD, AND COMPUTER-READABLE RECORDING MEDIUM WHICH CONTROLS THE DISPLAYING OF CONTENT FROM A SERVER

CROSS-REFERENCE TO RELATED APPLICATIONS

The present application claims priority to and incorporates by reference the entire contents of Japanese Patent Application No. 2013-270270 filed in Japan on Dec. 26, 2013.

BACKGROUND OF THE INVENTION

1. Field of the Invention

The present invention relates to an information processing apparatus, an information processing method, and a computer-readable recording medium having a program.

2. Description of the Related Art

Conventionally, there has been available such a system that displays an advertisement (contents) on a display mounted on an image forming apparatus like an MFP/LP device during execution of a job such as copying or scanning in the image forming apparatus. In addition, such a technique has also been suggested which computes the predicted time for executing a job (predicted processing time) from job setting information and automatically selects and displays an advertisement that is adapted to the time. This prevents the job from being ended while the advertisement is still being displayed, thereby preventing the display of the advertisement from being forcefully terminated (for example, Japanese Laid-open Patent Publication No. 2009-116653).

However, according to the conventional techniques, the user who directs the job execution is only forcefully exposed to the display of the advertisement. When such an advertisement in which the user is not interested is displayed, the advertisement cannot provide as much effect as intended.

In view of the aforementioned problems, there is a need to provide an information processing apparatus, an information processing method, and a non-transitory computer-readable recording medium having a program which can enhance the advertisement effects of contents to be displayed during execution of predetermined processing.

SUMMARY OF THE INVENTION

It is an object of the present invention to at least partially solve the problems in the conventional technology.

According to the present invention, there is provided an information processing apparatus comprising: an acquisition unit that acquires a plurality of contents from a server; a first control unit that provides control to display the contents on a display unit during execution of predetermined processing; and a second control unit that provides control to switch the contents being displayed in response to a user operation.

The present invention also provides an information processing method comprising: an acquisition step of acquiring a plurality of contents from a server; a first control step of providing control to display the contents on a display unit during execution of predetermined processing; and a second control step of providing control to switch the contents being displayed in response to a user operation.

The present invention also provides a non-transitory computer-readable recording medium that contains a computer program that causes a computer to function as: an acquisition unit that acquires a plurality of contents from a server; a first control unit that provides control to display the contents on a display unit during execution of predetermined processing; and a second control unit that provides control to switch the contents being displayed in response to a user operation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Now, referring to the accompanying drawings, an information processing apparatus, an information processing method, and a computer-readable recording medium having a program according to an embodiment of the present invention will be described in more detail. In the descriptions below, the information processing apparatus according to the present invention will be described by way of an example in which the apparatus is applied to a multifunction peripheral (MFP). However, the invention is not limited thereto. Note that the multifunction peripheral has at least two of the following functions: the printer function, the copier function, the scanner function, and the facsimile function.

Figure 1:
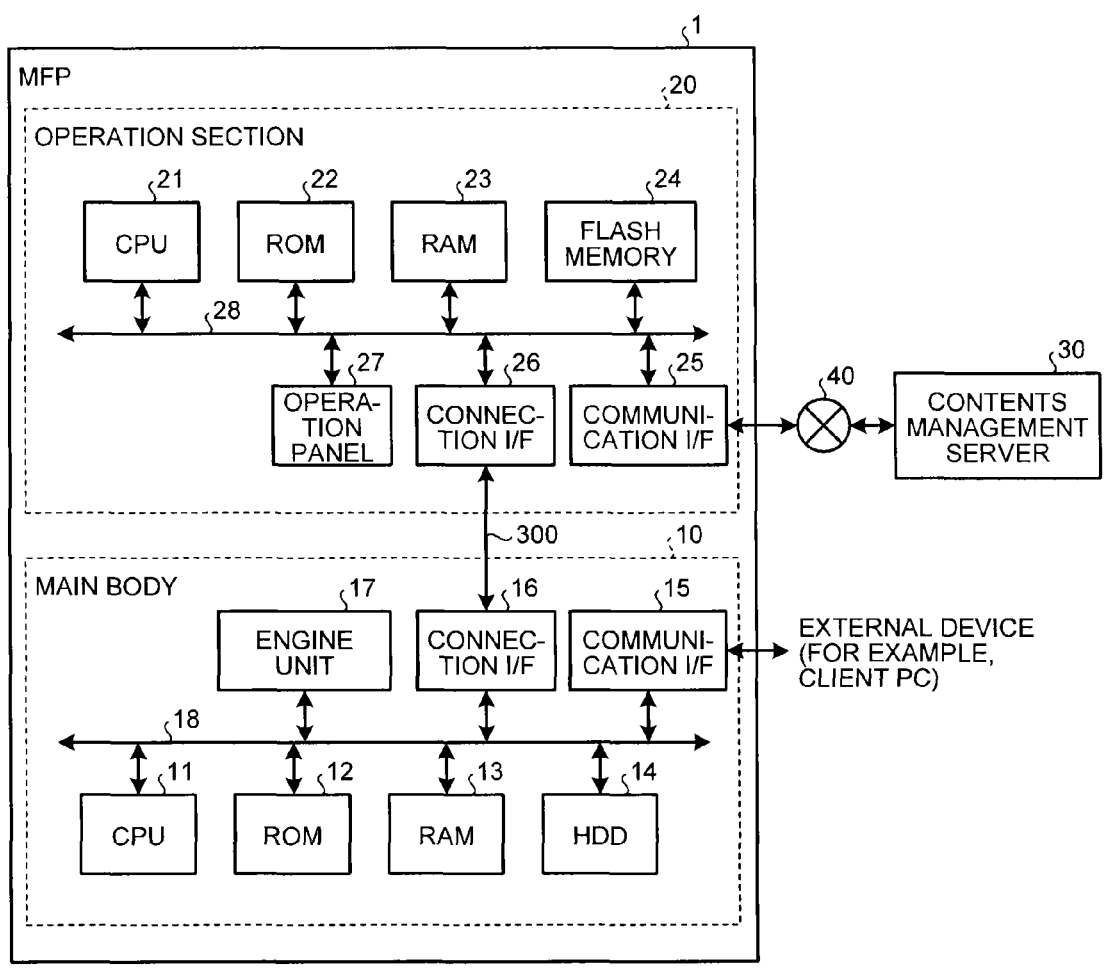
FIG. 1 is a diagram illustrating an example hardware configuration of an MFP (an information processing apparatus) according to an embodiment of the present invention.

FIG. 1 is a block diagram illustrating an example hardware configuration of an MFP 1 of this embodiment. In the example of FIG. 1, the MFP 1 is connected to a contents management server 30 over a network 40 such as the Internet. The contents management server 30 is a device which manages contents. As used herein, information of which the user is notified, for example, information relating to an advertisement (which may be a still image or video) or a device will be referred to as "contents". Any type or number of contents may be employed.

As illustrated in FIG. 1, the MFP 1 includes a main body 10 which can implement various types of functions such as the copier function, the scanner function, the facsimile function, and the printer function, and an operation section 20 for receiving an input in response to a user operation. The main body 10 and the operation section 20 are communicably connected to each other via a specific communication channel 300. The communication channel 300 to be employed may be, for example, one in conformity with the universal serial bus (USB) standards. However, those of any standards may be employed, wired or wireless.

Note that the main body 10 can operate in response to an input received by the operation section 20. In addition, the main body 10 can also communicate with an external device such as a client personal computer (PC) and operate in response to a command received from the external device.

Now, a description will be made to the hardware configuration of the main body 10. As illustrated in FIG. 1, the main body 10 includes a CPU 11, a ROM 12, a RAM 13, a hard disk drive (HDD) 14, a communication interface (I/F) 15, a connection I/F 16, and an engine unit 17, which are connected to each other via a system bus 18.

The CPU 11 collectively controls the operation of the main body 10. The CPU 11 executes a program stored in the ROM 12 or the HDD 14 with the RAM 13 employed as a work area (working area) to thereby control the entire operation of the main body 10 so as to implement various types of functions such as the copier function, the scanner function, the facsimile function, and the printer function which are mentioned above.

The communication I/F 15 is an interface to communicate with an external device such as a client personal computer (PC). The connection I/F 16 is an interface to communicate with the operation section 20 via the communication channel 300.

The engine unit 17 is a hardware unit for performing general-purpose information processing and processing other than communication processing in order to implement the copier function, the scanner function, the facsimile function, and the printer function. For example, the engine unit 17 includes a scanner (image reading unit) for scanning and reading an image on a manuscript, a plotter (image forming unit) for printing on a sheet material such as a sheet of paper, and a facsimile unit for performing facsimile communications. The engine unit 17 may further include particular options such as a finisher for assorting printed sheet materials or an automatic document feeder (ADF) for automatically feeding manuscripts.

Now, a description will be made to the hardware configuration of the operation section 20. As illustrated in FIG. 1, the operation section 20 includes a CPU 21, a ROM 22, a RAM 23, a flash memory 24, a communication I/F 25, a connection I/F 26, and an operation panel 27, which are connected to each other via a system bus 28.

The CPU 21 collectively controls the operation of the operation section 20. The CPU 21 executes a program stored, for example, in the ROM 22 or the flash memory 24 with the RAM 23 employed as a work area (working area) to thereby control the entire operation of the operation section 20 so as to implement various types of functions, to be discussed later, such as displaying information (images) in response to an input received from the user.

The communication I/F 25 is an interface to communicate with the contents management server 30 via the network 40. The connection I/F 26 is an interface to communicate with the main body 10 via the communication channel 300.

The operation panel 27 receives various types of inputs in response to a user operation as well as displays various types of information (for example, information in response to a received input, information indicative of the operational status of the MFP 1, information indicative of setting states). In this example, the operation panel 27 may be configured by a liquid crystal display device (LCD) which employs a touch panel function. However, the invention is not limited thereto. For example, it is also acceptable to employ an organic EL display device which employs a touch panel function. Furthermore, in addition to or in place of this function, it is also acceptable to provide a control part such as a hardware key or a display part such as a lamp.

Figure 2:
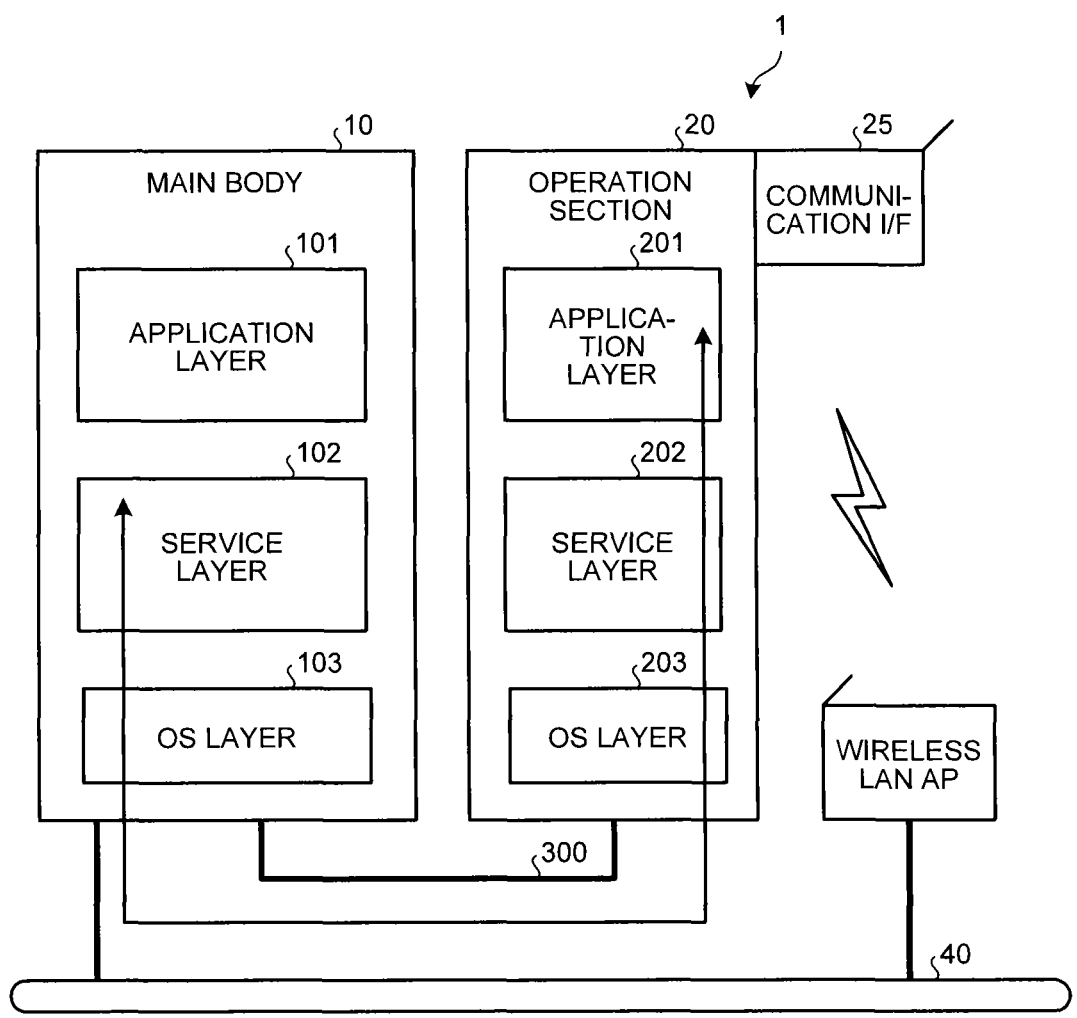
FIG. 2 is a diagram illustrating an example software configuration of the MFP.

Now, a description will be made to the software configuration of the MFP 1. FIG. 2 is a schematic diagram illustrating an example of the software configuration of the MFP 1. As illustrated in FIG. 2, the main body 10 has an application layer 101, a service layer 102, and an OS layer 103. The entities of the application layer 101, the service layer 102, and the OS layer 103 are various types of software which are stored, for example, in the ROM 12 or the HDD 14. The CPU 11 executes these pieces of software, thereby providing various types of functions.

The software of the application layer 101 is application software (hereinafter also simply referred to as an "application") for allowing hardware resources to operate and thereby provide a predetermined function. For example, applications may include a copier application for providing the copier function, a scanner application for providing the scanner function, a facsimile application for providing the facsimile function, and a printer application for providing the printer function.

The software of the service layer 102 is interposed between the application layer 101 and the OS layer 103 so as to provide an interface for using the hardware resources included in the main body 10. More specifically, the software provides functions for receiving requests to operate the hardware resources and for arbitrating the operation requests. The operation requests received by the service layer 102 are thought to be, for example, one for reading by a scanner or printing by a plotter.

Note that the interface function of the service layer 102 is provided not only to the application layer 101 of the main body 10 but also to an application layer 201 of the operation section 20. That is, the application layer 201 (application) of the operation section 20 can also implement, via the interface function of the service layer 102, functions using the hardware resources of the main body 10 (for example, the engine unit 17).

The software of the OS layer 103 is the basic software (operating system) for providing the basic function of controlling the hardware included in the main body 10. The software of the service layer 102 converts a request to use the hardware resources from various types of applications into a command that can be interpreted by the OS layer 103, and then passes the command to the OS layer 103. Then, the software of the OS layer 103 executes the command, thereby allowing the hardware resources to be operated in accordance with the request by the applications.

Likewise, the operation section 20 includes the application layer 201, a service layer 202, and an OS layer 203. The application layer 201, the service layer 202, and the OS layer 203 that are included in the operation section 20 are the same in the hierarchical structure as those counterparts included in the main body 10. However, the functions provided by applications of the application layer 201 and the types of operation requests that can be received by the service layer 202 are different from those of the main body 10. The applications of the application layer 201 may also serve as the software for operating the hardware resources included in the operation section 20 so as to provide predetermined functions. However, those applications are the software for mainly providing the function of the user interface (UI) for performing the operation or display relating to the functions (the copier function, the scanner function, the facsimile function, and the printer function) included in the main body 10.

Figure 3:
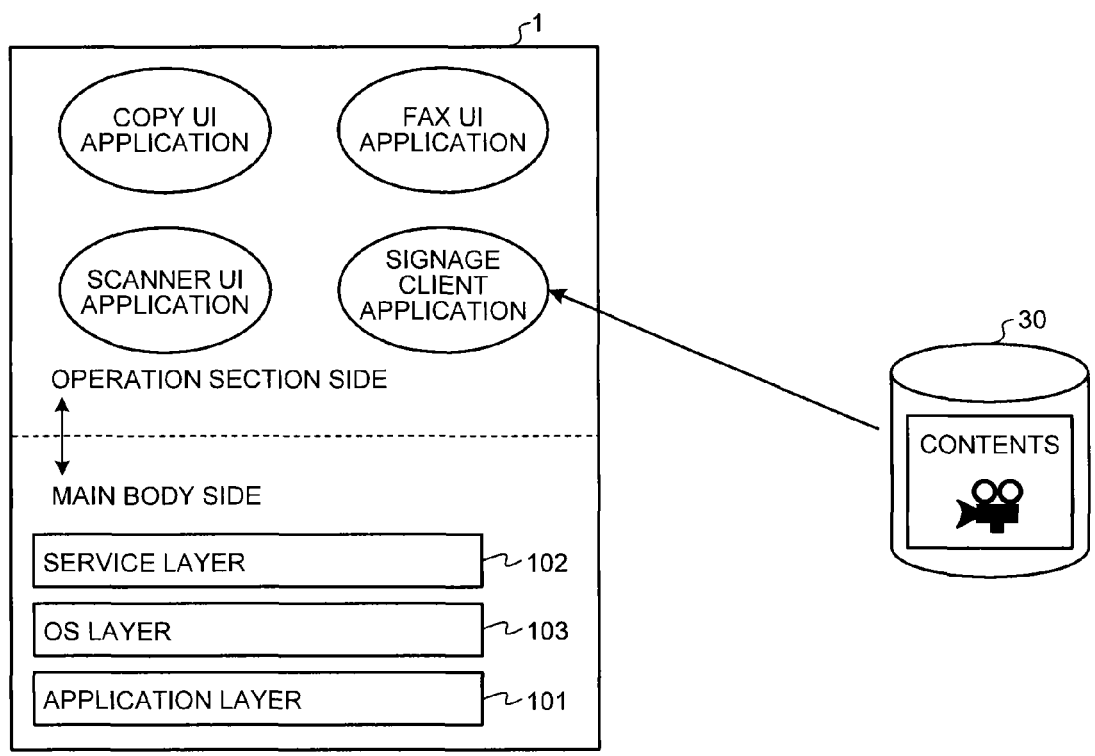
FIG. 3 is a diagram schematically illustrating an application on the side of an operation section.

As illustrated in FIG. 3, the applications of the application layer 201 on the operation section 20 side may include, for example, a copy UI application for providing the UI function of performing operation or display relating to the copier function; a fax UI application for providing the UI function of performing operation or display relating to the fax function; a scanner UI application for providing the UI function of performing operation or display relating to the scanner function; and a signage client application for providing the UI function of displaying the contents acquired (for example, downloaded) from the contents management server 30. However, the invention is not limited thereto.

Referring back to FIG. 2, a description will be continued. In order to keep the functions independent, this embodiment is configured such that the software of the OS layer 103 on the side of the main body 10 and the software of the OS layer 203 on the side of the operation section 20 are different from each other. That is, the main body 10 and the operation section 20 operate on separate operating systems independently of each other. For example, it is also possible to employ Linux (registered trade mark) as the software of the OS layer 103 on the side of the main body 10 and Android (registered trade mark) as the software of the OS layer 203 on the side of the operation section 20.

As described above, the MFP 1 of this embodiment is configured such that the main body 10 and the operation section 20 operate on separate operating systems, so that the main body 10 and the operation section 20 communicate each other not as the communications between processes within the common system but as the communications between different systems. These correspond to the operation (command communication) of transmitting an input (command details from the user) received by the operation section 20 to the main body 10 or the operation of the main body 10 notifying the operation section 20 of an event. Here, the operation section 20 performs command communications with the main body 10, thereby allowing for using the function of the main body 10. On the other hand, the events of which the main body 10 notifies the operation section 20 may include, for example, the statuses of execution of the operation in the main body 10 and the details set on the main body 10 side.

Furthermore, in this embodiment, since power is supplied to the operation section 20 from the main body 10 through the communication channel 300, the power supply control of the operation section 20 can be provided separately from (independently of) the power supply control of the main body 10.

Figure 4:
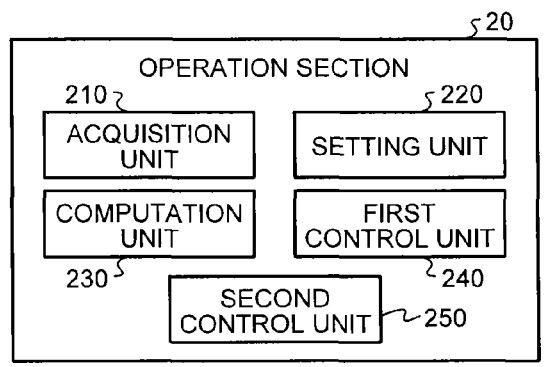
FIG. 4 is a diagram illustrating an example functional configuration of the operation section.

Now, a description will be made mainly to the function provided by the signage client application mentioned above. FIG. 4 is a diagram illustrating an example of the functional configuration of the operation section 20. For convenience of explanation, FIG. 4 illustrates the function relating to the present invention; however, the functions of the operation section 20 are not limited thereto.

As illustrated in FIG. 4, the operation section 20 includes an acquisition unit 210, a setting unit 220, a computation unit 230, a first control unit 240, and a second control unit 250.

The acquisition unit 210 acquires a plurality of contents from the contents management server 30. The plurality of contents acquired by the acquisition unit 210 are accumulated in a storage medium (for example, the flash memory 24) that is included in the operation section 20. Note that the acquisition unit 210 acquires contents at any timing. For example, the acquisition unit 210 can download contents from the contents management server 30 at predetermined intervals or can also download contents at any timing in response to an operation received from the user.

Figure 5:
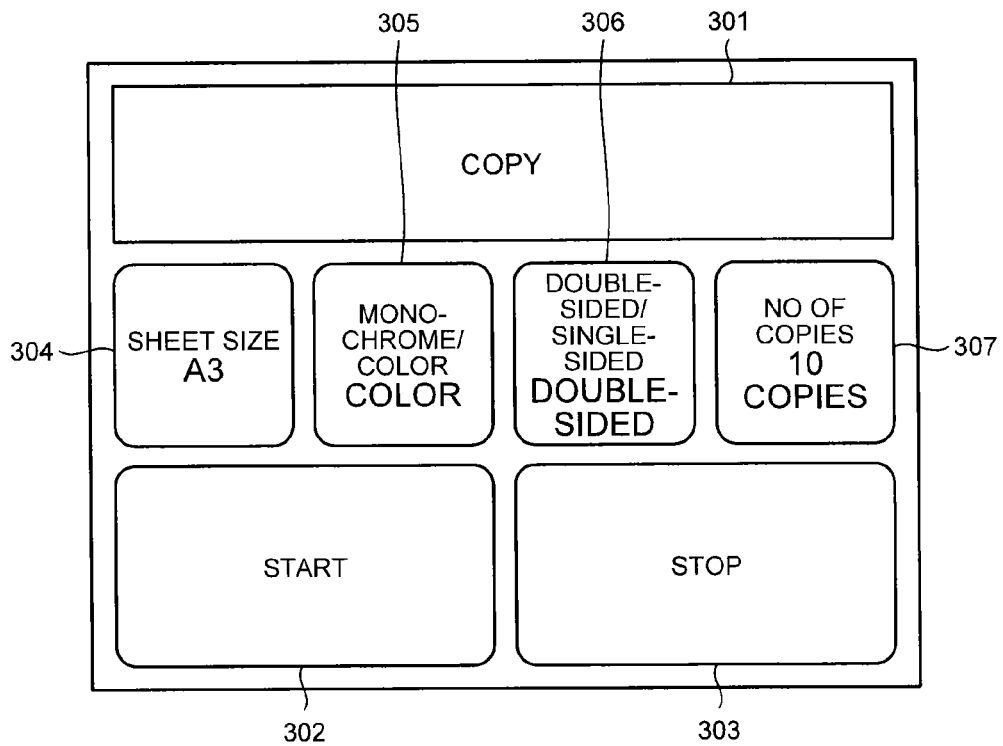
FIG. 5 is a diagram illustrating an example of a copy operation screen.

The setting unit 220 displays a copy operation screen as illustrated in FIG. 5 when having received a user operation to call the copier function. In the example of FIG. 5, the copy operation screen displays the following: an image 301 for showing that the copy function is provided; a UI image 302 for receiving a copy execution command; a UI image 303 for receiving a copy stop command; a UI image 304 for receiving a sheet size setting command (an input of setting information); a UI image 305 for receiving a setting command for monochrome or color; a UI image 306 for receiving a double-side or single-side setting command; and a UI image 307 for receiving a command to set the number of print sheets (number of copies). However, the invention is not limited thereto. In this example, the setting unit 220 sets the conditions for executing printing by determining the sheet size, color, double-sided/single-sided, number of copies in response to the setting command received on each of the UI images 304, 305, 306, and 307 mentioned above.

Referring back to FIG. 4, a description will be continued. The computation unit 230 computes a predicted printing time indicative of a predicted time for execution of printing on the basis of the conditions for execution of printing that have been set by the setting unit 220. This computation method may employ various well-known techniques. Note that in this example, it is thought that the printing process corresponds to the "predetermined process" in the claims of the present application, while the predicted printing time corresponds to the "predicted processing time" in the claims of the present application. However, the invention is not limited thereto.

Figure 6:
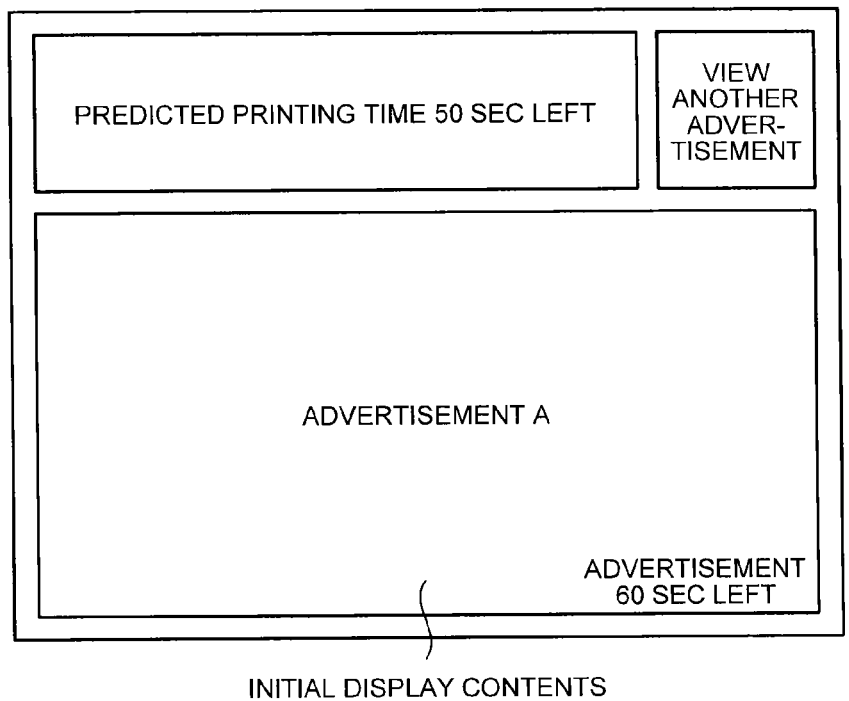
FIG. 6 is a diagram illustrating an example of display of initial display contents.

The first control unit 240 provides control to display contents on the operation panel 27 (which corresponds to the "display unit" in the claims of the present application) during execution of the printing process. In this embodiment, when the printing process is started, the first control unit 240 selects, as initial display contents, any one set of contents of which contents display time can be accommodated within the aforementioned predicted printing time, the contents display time being indicative of the time required to display all the details of the set of contents among the plurality of contents acquired by the acquisition unit 210. Then, as illustrated in FIG. 6, the first control unit 240 provides control to display, on the operation panel 27, the selected initial display contents (in the example of FIG. 6, the contents being indicative of "advertisement A"). In the example of FIG. 6, the first control unit 240 provides control to display, on the operation panel 27 in conjunction with the initial display contents, the remaining time of the contents display time of the initial display contents ("60 seconds" in the example of FIG. 6) and the remaining time of the predicted printing time ("50 seconds" in the example of FIG. 6).

Figure 7:
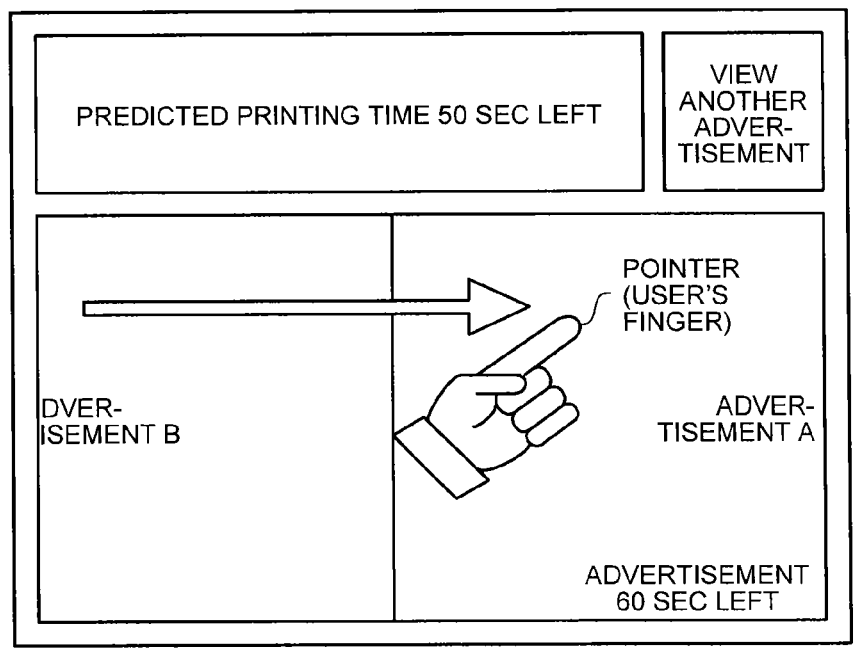
FIG. 7 is a diagram illustrating contents being displayed which are switched in response to a flick operation.

The second control unit 250 provides control to switch contents being displayed in response to a user operation. In this embodiment, upon reception of a user operation indicative of an operation (which can also be interpreted as a socalled flick operation) for moving a pointer (for example, an object such as a user's finger or a pen) in contact with the operation panel 27, the second control unit 250 provides control to switch contents being displayed in response to the direction of movement of the pointer. For example, as illustrated in FIG. 7, when the direction of movement of the pointer (a user "finger" in this example) is indicative of the rightward direction, the second control unit 250 provides control to select, as contents to be displayed, contents indicative of "advertisement B" placed prior to contents indicative of "advertisement A" among the plurality of contents (the plurality of contents being acquired by the acquisition unit 210) arranged according to predetermined rules. Then, the first control unit 240 provides control to display the contents that the second control unit 250 has selected.

Figure 8:
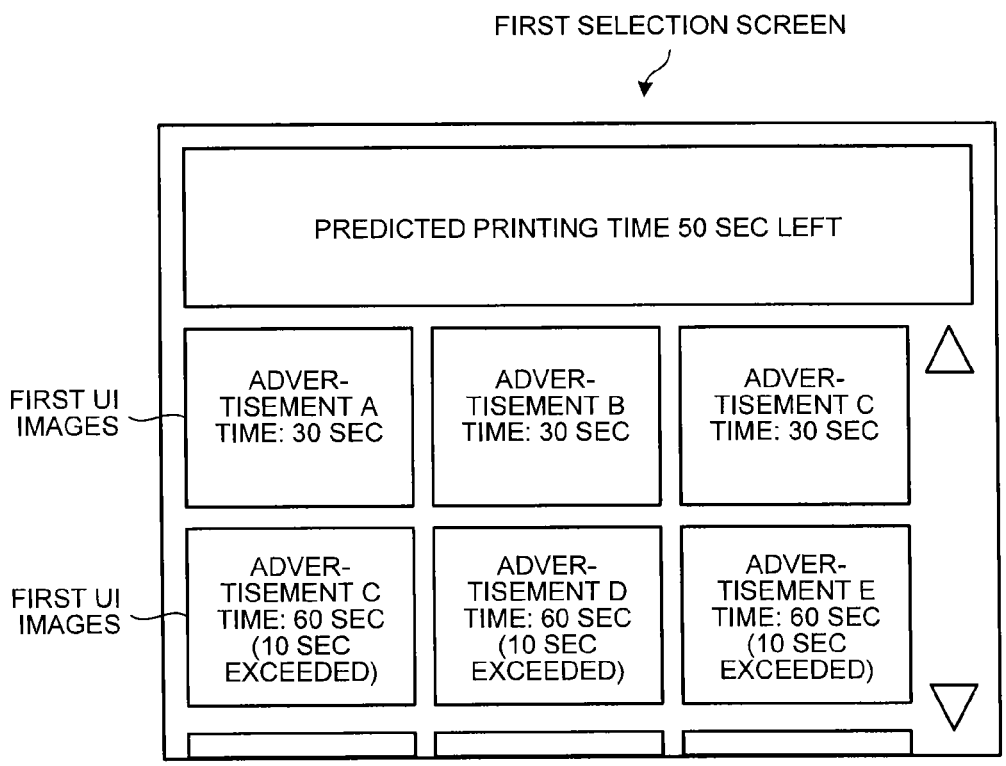
FIG. 8 is a diagram illustrating an example of a first selection screen.

Furthermore, when having received, from the user, a request to display a first selection screen for selecting contents to be displayed, the second control unit 250 provides control to display the first selection screen on the operation panel 27. FIG. 8 is a diagram illustrating an example of the first selection screen. As illustrated in FIG. 8, the first selection screen prompts the user to select, from among a plurality of first UI images corresponding one-to-one to the plurality of contents acquired by the acquisition unit 210, a first UI image corresponding to contents to be displayed. In the example of FIG. 8, the second control unit 250 provides control to display an indication for a first UI image, among the plurality of first UI images displayed on the first selection screen, corresponding to contents of which contents display time will exceed a predicted printing time (in the example of FIG. 8, the contents being indicative of "advertisement C," the contents indicative of "advertisement D," and the contents indicative of "advertisement E"), the indication being indicative of this fact. Then, upon reception of a user operation for selecting any one of the first UI images (for example, the operation with the pointer to depress any one of the first UI images), the second control unit 250 provides control to select, as contents to be displayed, the contents corresponding to the first UI image selected by the user operation. Then, the first control unit 240 provides control to display the contents selected by the second control unit 250.

Figure 9:
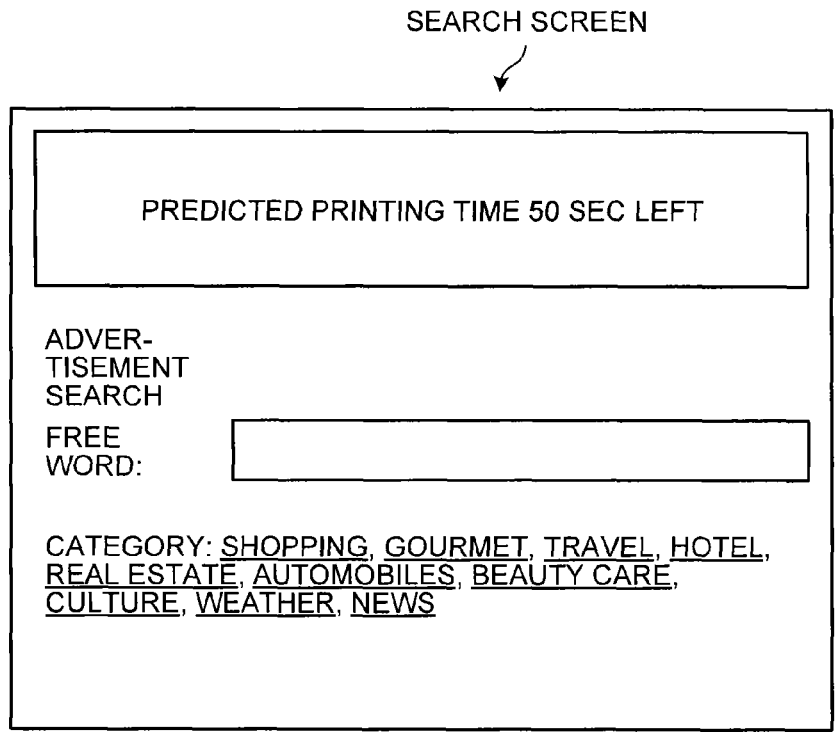
FIG. 9 is a diagram illustrating an example of a search screen.

Furthermore, when a request to display a search screen for searching for candidate contents to be displayed is received from the user, the second control unit 250 provides control to display the search screen on the operation panel 27. FIG. 9 is a diagram illustrating an example search screen. Upon reception of a user operation for searching for contents that match a search condition (for example, an input of a keyword or a command to select a category), the second control unit 250 provides control to search for contents that match a search condition from among the plurality of contents acquired by the acquisition unit 210, and then selects any of one or more sets of contents indicative of the search result. More specifically, the second control unit 250 provides control to display a second selection screen (not shown) for prompting the user to select, from among a plurality of second UI images corresponding one-to-one to one or more sets of contents that match a search condition, a second UI image corresponding to the contents to be displayed. Then, upon reception of a user operation for selecting any of the second UI images (for example, the operation with the pointer to depress any one of the second UI images), the second control unit 250 provides control to select, as contents to be displayed, the contents corresponding to the second UI image selected by the user operation. Note that the second UI image may or may not be the same image as the aforementioned first UI image.

Figure 10:
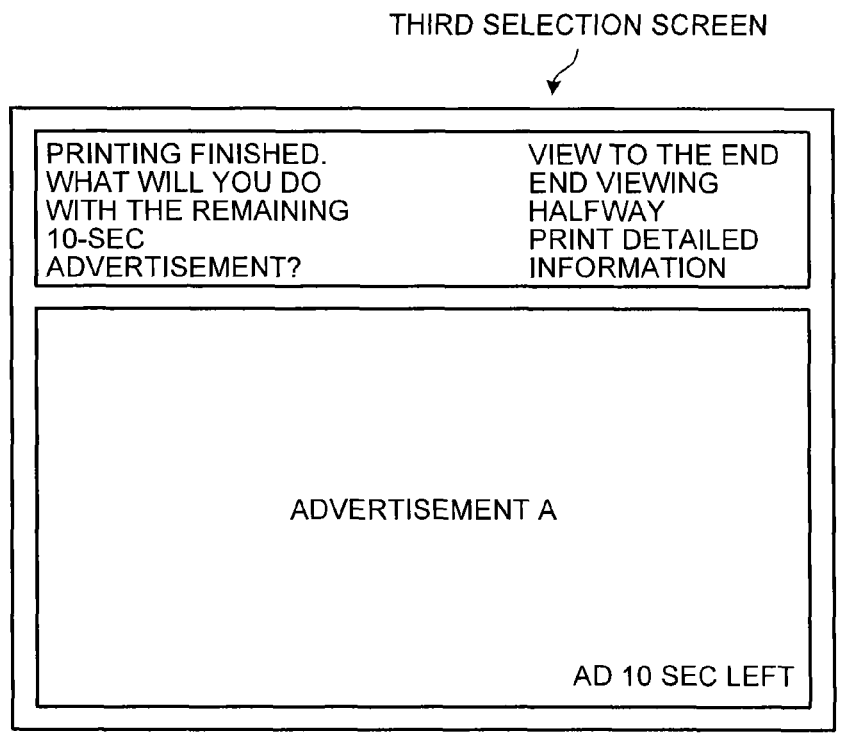
FIG. 10 is a diagram illustrating an example of a third selection screen.

Then, the first control unit 240 provides control to display the contents selected by the second control unit 250. Furthermore, in this embodiment, when some of the contents to be displayed have not yet been displayed at the point in time the printing process is completed, the first control unit 240 provides control to display a third selection screen for prompting the user to select whether to display the not-yet-displayed contents as illustrated in FIG. 10. The first control unit 240 provides control to display the not-yet-displayed contents upon reception of a user operation for selecting to display the not-yet-displayed contents (in the example of FIG. 10, upon reception of the operation with the pointer to depress the UI image indicative of "View to the end"). On the one hand, the first control unit 240 ends the display of the contents upon reception of a user operation for selecting not to display the not-yet-displayed contents (in the example of FIG. 10, upon reception of the operation with the pointer to depress the UI image indicative of "End viewing halfway").

In this embodiment, the function of each unit (the acquisition unit 210, the setting unit 220, the computation unit 230, the first control unit 240, and the second control unit 250) in the operation section 20 described above is achieved by the CPU 21 executing programs stored, for example, in the ROM 22 or the flash memory 24 with the RAM 23 as a work area (working area). Note that the invention is not limited thereto; for example, at least part of the function of each unit in the aforementioned operation section 20 may be achieved by a specific hardware circuit (for example, a semiconductor integrated circuit).

Figure 11:
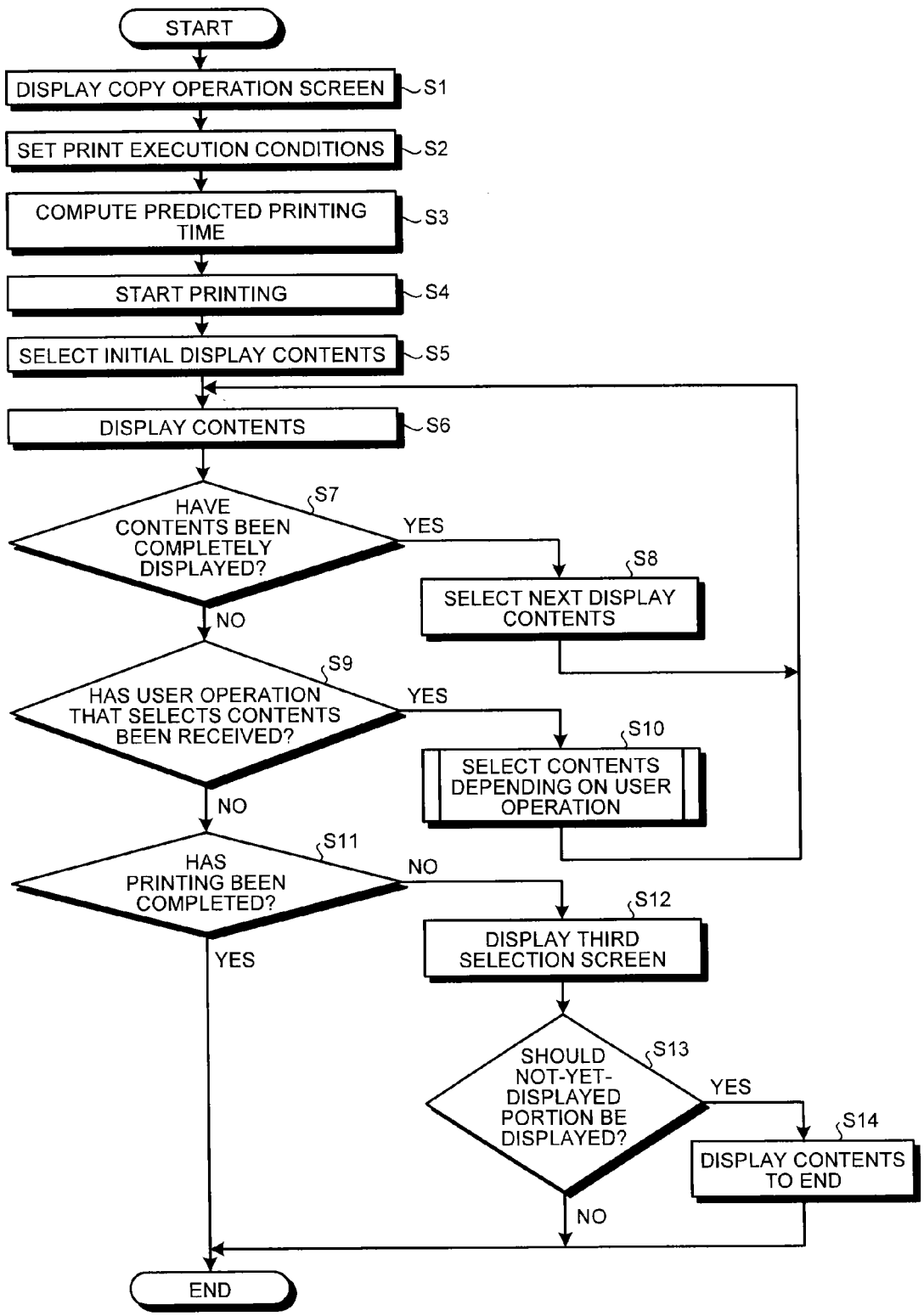
FIG. 11 is a flowchart showing an exemplary operation of the MFP.

Now, referring to FIG. 11, a description will be made to an exemplary operation of the MFP 1 of this embodiment. FIG. 11 is a flowchart showing an exemplary operation of the MFP 1. In the description below, the function of the aforementioned operation section 20 will be mainly explained. As illustrated in FIG. 11, the setting unit 220 first displays the aforementioned copy operation screen (see FIG. 5) upon reception of a user operation for calling the copier function (step S1). Next, the setting unit 220 sets conditions for executing printing on the basis of a user setting command on the copy operation screen (step S2). Next, the computation unit 230 computes a predicted printing time on the basis of the conditions for executing printing that have been set in step S2 (step S3). Then, when the printing process is started (step S4), the first control unit 240 selects the initial display contents (step S5) and provides control to display the contents selected as the initial display contents (step S6).

Next, the first control unit 240 determines whether or not the contents to be displayed have been completely displayed (step S7). When the contents have been completely displayed (step S7: Yes), the first control unit 240 selects the next contents to be displayed (step S8), and provides control to display the selected contents (step S6). Subsequently, the processing in step S7 onward will be repeated.

On the other hand, when the contents to be displayed have not yet been completely displayed (step S7: No) and a user operation for selecting contents has been received (step S9: Yes), the second control unit 250 provides control to select contents in response to the user operation (step S10). The specific details of step S10 will be discussed later. After step S10, the first control unit 240 provides control to display the contents selected by the second control unit 250 (step S6). Subsequently, the processing in step S7 onward will be repeated.

When the user operation for selecting contents has not been received in step S9 above (step S9: No), the first control unit 240 determines whether or not the printing process has been completed (step S11). If it is determined that the printing process has been completed (step S11: Yes), the process ends at this point in time. If it is determined that the printing process has not been completed (step S11: No), the first control unit 240 provides control to display the aforementioned third selection screen (see FIG. 10) (step S12). Then, upon reception of a user operation for selecting to display not-yet-displayed contents (step S13: Yes), the first control unit 240 provides control to display the not-yet-displayed contents (step S14) (i.e., to display the contents to be displayed to the end). On the other hand, upon reception of a user operation for selecting not to display the not-yet-displayed contents (step S13: No), the first control unit 240 ends (forcefully ends halfway) the display of the contents being displayed.

Figure 12:
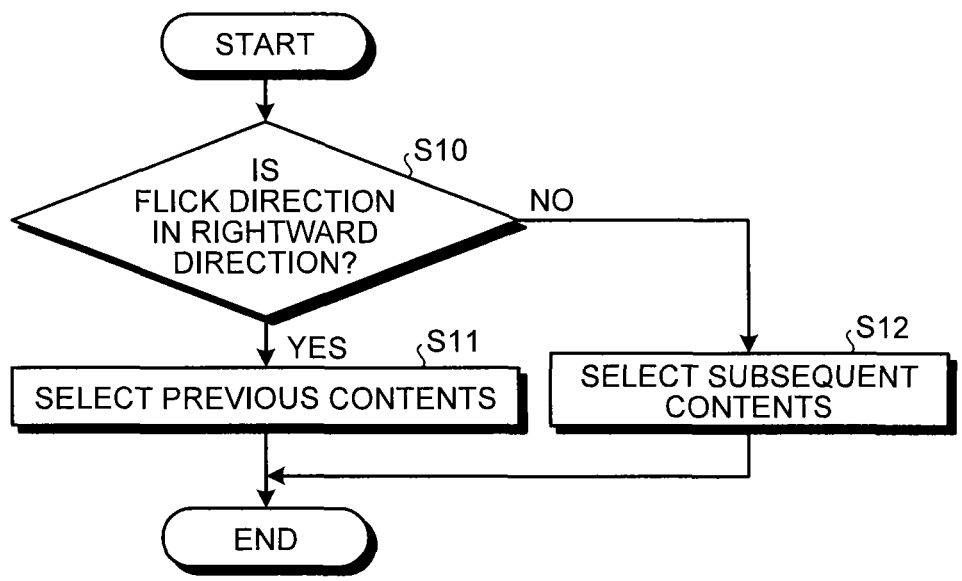
FIG. 12 is a flowchart showing an exemplary operation of a second control unit.

Now, referring to FIG. 12 to FIG. 14, a description will be made to the specific details of step S10 above. FIG. 12 is a flowchart showing an exemplary operation when the second control unit 250 has received an operation (flick operation) for moving the pointer in contact with the operation panel 27 in step S9 above. In this example, when the direction of movement of the pointer (the direction of the flick) shows the rightward direction (step S10: Yes), the second control unit 250 provides control to select, as contents to be displayed, the previous contents rather than the contents being currently displayed (step S11). On the other hand, when the flick direction is not the rightward direction (step S10: No) but the leftward direction as in this example, the second control unit 250 provides control to select, as the contents to be displayed, the subsequent contents rather than the contents being currently displayed (step S12).

Figure 13:
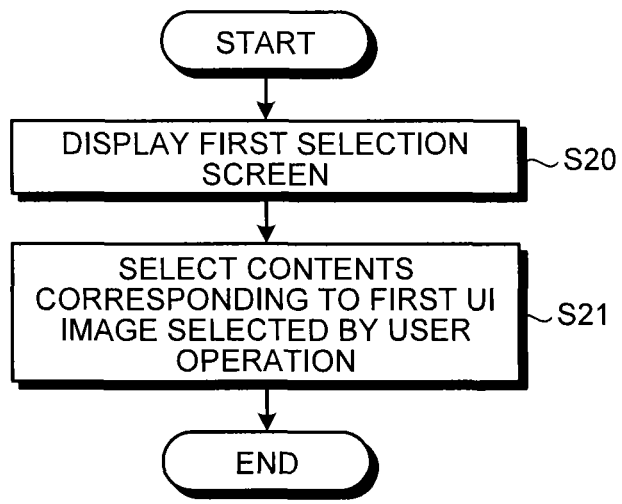
FIG. 13 is a flowchart showing an exemplary operation of the second control unit.

FIG. 13 is a flowchart showing an exemplary operation when the second control unit 250 has received a request to display the aforementioned first selection screen (see FIG. 8) in step S9 above. First, the second control unit 250 provides control to display the first selection screen (step S20). Next, upon reception of a user operation for selecting any one of a plurality of UI images (for example, an operation with the pointer to depress any one of first UI images) displayed on the first selection screen (a plurality of UI images corresponding one-to-one to the plurality of contents acquired by the acquisition unit 210), the second control unit 250 provides control to select, as contents to be displayed, the contents corresponding to the first UI image selected by the user operation (step S21).

Figure 14:
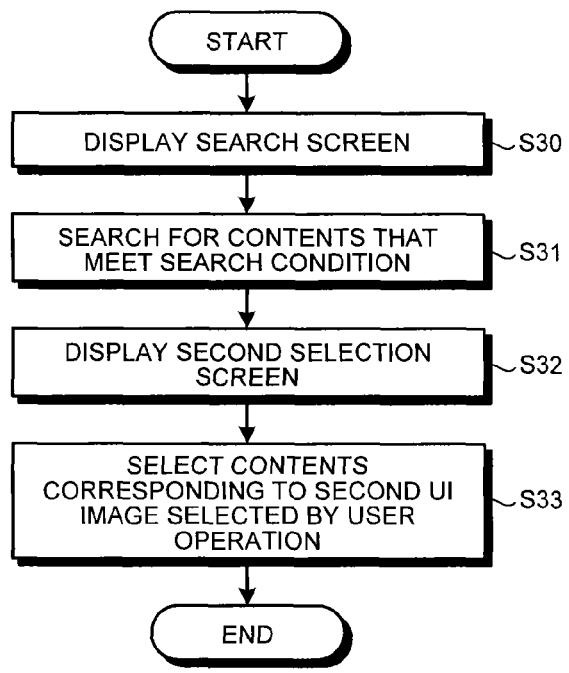
FIG. 14 is a flowchart showing an exemplary operation of the second control unit.

FIG. 14 is a flowchart showing an exemplary operation when the second control unit 250 has received a request to display the aforementioned search screen in step S9 above. First, the second control unit 250 provides control to display a search screen (step S30). Next, upon reception of a user operation (for example, an input of a keyword or a command to select a category) for searching for contents that match a search condition, the second control unit 250 searches for contents that match a search condition from among the plurality of contents acquired by the acquisition unit 210 (step S31). Next, the second control unit 250 provides control to display the second selection screen for prompting the user to select a second UI image, which corresponds to contents to be displayed, from among a plurality of second UI images corresponding one-to-one to one or more sets of contents (one or more sets of contents indicative of a search result) that match the search condition (step S32). Next, upon reception of a user operation for selecting any one of the second UI images (for example, the operation with the pointer to depress any one of the second UI images), the second control unit 250 provides control to select, as contents to be displayed, the contents corresponding to the second UI image selected by the user operation (step S33).

As described above, in this embodiment, contents being displayed during execution of a printing process are switched in response to a user operation. Thus, for example, when an advertisement that the user does not interest in is displayed, the user can switch the advertisement to another advertisement that the user interests in. This allows for achieving advantageous effects that the advertisement effects of an advertisement displayed during execution of the printing process can be enhanced.

Modified Example

Now, modified examples will be described below. The following modified examples may be arbitrarily combined with each other. Furthermore, the following modified examples may also be arbitrarily combined with the aforementioned embodiment.

(1) Modified Example 1

Figure 15:
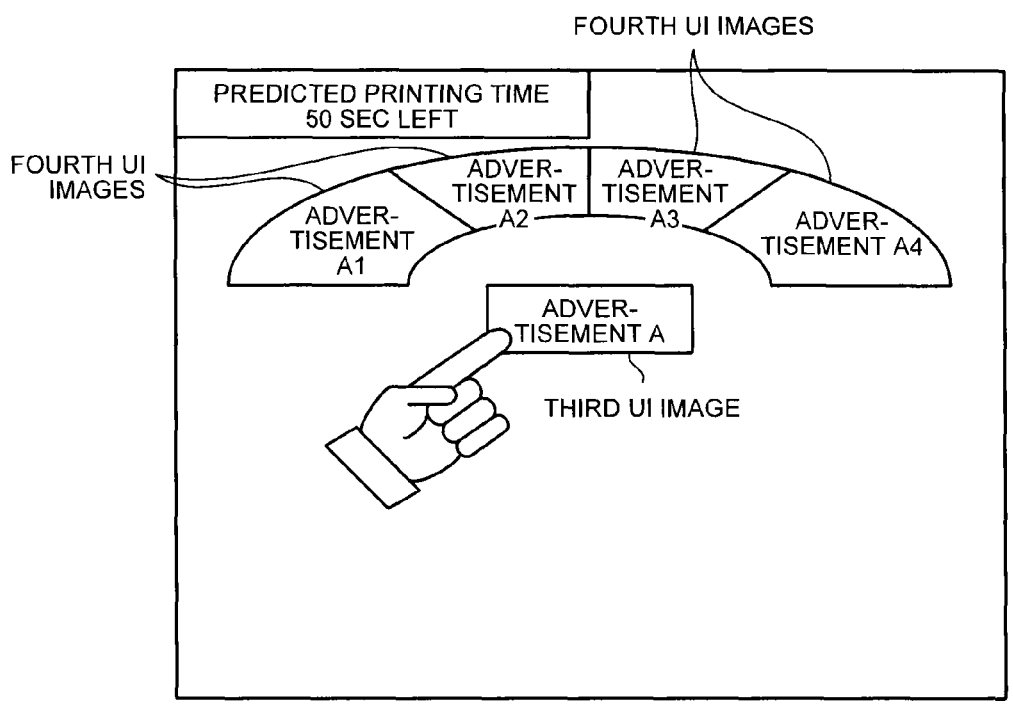
FIG. 15 is a diagram illustrating a modified specific example.

For example, upon reception of a user operation for bringing the pointer into contact with the contents displayed on the operation panel 27 or a third UI image corresponding to the contents (which may or may not be the same image as the first UI image or the second UI image mentioned above), the second control unit 250 can also provide control to display a plurality of fourth UI images corresponding one-to-one to a plurality of contents associated with the contents. FIG. 15 illustrates an example in which when the user touches with his/her finger a third UI image corresponding to contents indicative of "advertisement A," displayed are a plurality of (four) fourth UI images corresponding one-to-one to a plurality of contents associated with "advertisement A" (in the example of FIG. 15, the contents indicative of "advertisement A1," the contents indicative of "advertisement A2," the contents indicative of "advertisement A3," and the contents indicative of "advertisement A4").

In this modified example, upon reception of a user operation for moving (sliding) the pointer in contact with the operation panel 27 to a position corresponding to any one of the fourth UI images, the second control unit 250 can provide control to select, as contents to be displayed, the contents corresponding to the fourth UI image.

(2) Modified Example 2

The type of contents is not limited to "advertisements," but may also be, for example, intra-company messages or information relating to devices. In short, various types of information of which the user is notified can be employed as contents.

(3) Modified Example 3

In the aforementioned embodiment, the main body 10 and the operation section 20 operate on separate operating systems independently of each other. However, the invention is not limited thereto. For example, the main body 10 and the operation section 20 may also operate on the same operating system.

In short, the present invention is configured such that an information processing apparatus corresponding to the MFP 1 and the operation section 20 or the like only has to include at least the function corresponding to the aforementioned acquisition unit 210, the function corresponding to the aforementioned first control unit 240, and the function corresponding to the aforementioned second control unit 250.

Program

The programs to be executed in the MFP 1 of the aforementioned embodiment may be provided in an installable format or executable format file on a non-transitory computer-readable recording medium such as a CD-ROM, flexible disk (FD), CD-R, digital versatile disk (DVD), or universal serial bus (USB) device, or may also be provided or distributed via a network such as the Internet. Furthermore, various types of programs incorporated in advance into a ROM or the like may also be provided.

According to the present invention, it is possible to enhance the advertisement effects of contents to be displayed during execution of predetermined processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a processor configured to perform:
acquiring a plurality of contents from a server;
controlling to display the contents on a display unit during execution of predetermined processing; and
controlling to switch the contents being displayed in response to a user operation,
wherein when some of the contents to be displayed have not yet been displayed at a point in time the predetermined processing is completed, the controlling to display controls display of a third selection screen for prompting to select whether or not to display the not-yet-displayed contents; and when the controlling to display has received the user operation that selects to display the not-yet-displayed contents, the controlling to display displays the not-yet-displayed contents, and when the controlling to display has received the user operation that selects not to display the not-yet-displayed contents, the controlling to display ends the display of the contents.

2. The information processing apparatus according to claim 1, wherein
when the controlling to switch has received the user operation indicative of an operation that moves a pointer in contact with the display unit, the controlling to switch provides control to switch the contents being displayed in response to the direction of movement of the pointer.

3. The information processing apparatus according to claim 1, wherein
the controlling to switch provides control to display a first selection screen for prompting to select, from among a plurality of first UI images corresponding one-to-one to the plurality of contents, a first UI image corresponding to the contents to be displayed, and upon reception of the user operation that selects any of the first UI images, the controlling to switch provides control to select, as the contents to be displayed, the contents corresponding to the first UI image selected by the user operation.

4. The information processing apparatus according to claim 3, wherein:
the processor is further configured to compute a predicted processing time indicative of a predicted time for execution of the predetermined process on the basis of a condition for execution of the predetermined process, and
the controlling to switch provides control to display an indication for a first UI image, among the plurality of first UI images displayed on the first selection screen, corresponding to the contents of which contents display time indicative of a time required to display all details of the contents will exceed the predicted processing time, the indication being indicative of this fact.

5. The information processing apparatus according to claim 1, wherein
when the controlling to switch provides control to display a search screen for searching for a candidate for the contents to be displayed and has received the user operation for searching for the contents that match a search condition, the controlling to switch provides control to search for the contents that match the search condition from among the plurality of contents acquired by the acquisition unit and selects, as the contents to be displayed, any one or more sets of the contents indicative of the search result.

6. The information processing apparatus according to claim 5, wherein
when the controlling to switch provides control to display a second selection screen for prompting to select, from among a plurality of second UI images corresponding one-to-one to one or more sets of contents that match the search condition, the second UI image corresponding to the contents to be displayed and has received the user operation that selects any one of the second UI images, the controlling to switch provides control to select, as the contents to be displayed, the contents corresponding to the second UI image selected by the user operation.

7. The information processing apparatus according to claim 1, wherein
when the controlling to switch has received the user operation that brings a pointer into contact with the contents displayed on the display unit or a third UI image corresponding to the contents, the controlling to switch provides control to display a plurality of fourth UI images corresponding one-to-one to the plurality of contents associated with the contents.

8. The information processing apparatus according to claim 7, wherein
when the controlling to switch has received the user operation that moves the pointer in contact with the display unit to a position corresponding to any one of the fourth UI images, the controlling to switch provides control to select, as the contents to be displayed, the contents corresponding to the fourth UI image.

9. An information processing method comprising:
acquiring a plurality of contents from a server;
controlling to display the contents on a display during execution of predetermined processing; and
controlling to switch the contents being displayed in response to a user operation,
wherein when some of the contents to be displayed have not yet been displayed at a point in time the predetermined processing is completed, a third selection screen is displayed for prompting to select whether or not to display the not-yet-displayed contents; and when a user operation that selects to display the not-yet-displayed contents has been received, the not-yet-displayed contents are displayed, and when the a user operation that selects not to display the not-yet-displayed contents is received, the display of the contents ends.

10. A non-transitory computer-readable recording medium that contains a computer program that causes a computer to perform the steps of:
acquiring a plurality of contents from a server;
displaying the contents on a display during execution of predetermined processing; and switching the contents being displayed in response to a user operation, wherein when some of the contents to be displayed have not yet been displayed at a point in time the predetermined processing is completed, a third selection screen is displayed for prompting to select whether or not to display the not-yet-displayed contents; and when a user operation that selects to display the not-yet-displayed contents has been received, the not-yet-displayed contents are displayed, and when the a user operation that selects not to display the not-yet-displayed contents is received, the display of the contents ends.

* * * * *